United States Patent [19]
Wilson

[11] Patent Number: 6,002,398
[45] Date of Patent: Dec. 14, 1999

[54] NAVIGATION BETWEEN PROPERTY PAGES WITH TABS AND MENUS

[75] Inventor: Daniel B. Wilson, Cedar Hills, Utah

[73] Assignee: Novell, Inc., Provo, Utah

[21] Appl. No.: 08/960,809

[22] Filed: Oct. 30, 1997

[51] Int. Cl.[6] .................................................. G06F 3/00
[52] U.S. Cl. ........................... 345/346; 345/347; 345/350
[58] Field of Search ..................................... 345/326–358, 345/968–978

[56] References Cited

U.S. PATENT DOCUMENTS

| | | | |
|---|---|---|---|
| 5,140,678 | 8/1992 | Torres ....................................... | 345/350 |
| 5,283,864 | 2/1994 | Knowlton ................................. | 345/350 |
| 5,392,387 | 2/1995 | Fitzpatrick et al. ..................... | 345/350 |
| 5,668,964 | 9/1997 | Helsel et al. ............................. | 345/350 |
| 5,745,718 | 4/1998 | Cline et al. .............................. | 345/352 |

OTHER PUBLICATIONS

Advanced Interface Design Guide, IBM Corp., pp. 39–50, 95–100, Jun. 1989.

Foley et al., "Computer Graphics: Principles and Practice", Addison–Welsey Pub. Co., pp. 364–369, 445–454, Nov. 1993.

Microsoft Press, *Introducing Microsoft Windows 95*, 1995 by Microsoft Corporation, Chapter 3—the Windows 95 User Interface, p. 39.

Programming with MFC: Encylopedia—Visual C++ Books Online, Standard Edition, Property Sheets 1992–1995 Microsoft Corporation (2 pages).

Win32 SDK: Win32, Overviews, Windows—Visual C++ Books Online, Standard Edition, Property Sheet Creation, 1992–1995 Microsoft Corporation (1 page).

Win32SDK: Win 32, Overviews, Windows—Visual C++ Books Online, Standard Edition, Property Dialog Boxes, 1992–1995 Microsoft Corporation (1 page).

The Windows Interface Guidelines for Software Design—Visual C++ Books Online, Standard Edition, Property Sheet Commands, 1992–1995 Microsoft Corporation (1 page).

Win32 SDK:Win32, Overviews, Windows—Visual C++ Books Online, Standard Edition, Creating a Tabbed Dialog Box, 1992–1995 Microsoft Corporation (4 pages).

Tutorials—Visual C++ Books Online, Standard Edition, Using Tabbed Property Pages, 1992–1995 Microsoft Corporation (2 pages).

Programming for the Windows 95 User Interface—Visual C++ Books Online, Standard Edition, Chapter 4 Tabs, Property Sheets and Wizards: Whiz–Bang Common Controls, 1992–1995 Microsoft Corporation (1 page).

Programming for the Windows 95 User Interface—Visual C++ Books Online, Standard Edition, Property Sheets, 1992–1995 Microsoft Corporation (2 pages).

Visual C++ 4.0: Programming with MFC Library—Visual C++Books Online, Standard Edition, Property Sheets and Property Pages, 1992–1995 Microsoft Corporation (1 page).

Programming with MFC: Encyclopedia—Visual C++Books Online, Standard Edition, *Property Sheets: Creating a Modeless Property Sheet*, 1992–1995 Microsoft Corporation (1 page).

Visual C++ 4.0: Programming with MFC Library—Visual C++Books Online, Standard Edition, Property Sheets and Property Pages, 1992–1995 Microsoft Corporation (1 page).

(List continued on next page.)

*Primary Examiner*—John E. Breene
*Attorney, Agent, or Firm*—Dinsmore & Shohl LLP

[57] ABSTRACT

A method for displaying a tabbed dialog box, a property sheet, which can be either modal or modeless. The property sheet has at least one child window. The child window has a tab field identifying a category of information. The parent window or property sheet has a multiple associated, displayable child windows. Upon selection of the tab field, a menu window is displayed with at least one menu item field. The menu item may be selectable by the user to initiate the display of another child window or subcategory menu window. The user can select the field to display a third child window, a property page which can display properties of an object.

22 Claims, 7 Drawing Sheets

OTHER PUBLICATIONS

Win 32 SDK: Win32, Overviews, Windows—Visual C++ Books Online, Standard Edition, About Property Sheets, 1992–1995 Microsoft Corporation (1 page).

Programming with MFC: Encylopedia—Visual C++ Books Online, Standard Edition, Property Sheets, 1992–1995 Microsoft Corporation (2 pages).

Class Library Reference—Visual C++ Books Online, Standard Edition, Property Page, 1992–1995 Microsoft Corporation (2 pages).

Visual C++4.0 User's Guide—Visual C++ Books Online, Standard Edition, Using Property Pages, 1992–1995 Microsoft Corporation (1 page).

Visual C++4.0: Programming with MFC: Encylopedia—Visual C++ Books Online, Standard Edition, Property Sheets: Handling the Apply Button (1page).

Programming for the Windows 95 User Interface—Visual C++ Books Online,Standard Edition, Incorporating a Property Sheet, 1992–1995 Microsoft Corporation (2 pages).

Win32 SDK: Guide, Prog Guide, Dev Apps for Win95—Visual C++ Books Online, Standard Edition, Incorporating Property Sheets, 1992–1995 Microsoft Corporation (2 pages).

Tutorials—Visual C++ Books Online, Standard Edition, Using Tabbed Property Pages, 1992–1995 Microsoft Corporation (2 pages).

NAVIGATION BETWEEN PROPERTY PAGES WITH TABS AND MENUS

COPYRIGHTS PRESERVED

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

TECHNICAL FIELD OF THE INVENTION

This invention relates to the field of processes and apparatuses for displaying information on a display device of a computer system, and, more particularly, to processes and apparatuses for displaying child windows associated with a tab field of a property sheet.

BACKGROUND OF THE INVENTION

Often times it is necessary for a user of a computer program to select certain functions or provide information to a computer application during its execution. User interfaces can accomplish this through a series of textual prompts, or, in the WINDOWS® programming environment, through the use of dialog boxes. A dialog box typically appears as a result of selecting a menu command that ends with an ellipse (e.g., Open . . . ). The dialog box opened by the menu command can provide additional selections for the user or display additional information. In this way, the dialog box can act as a type of menu extender which provides the user with additional choices. The dialog box can display these additional choices in the form of push buttons, list boxes, drop-down list boxes, check boxes, option buttons, and text boxes. Dialog boxes are child windows which are typically owned by a program's main window and can be either modal or modeless. A modal dialog box requires the user to supply information or cancel the application before allowing the main application to continue. A modeless dialog box allows the user to continue with the main application without closing the dialog box. For example, the user can switch between the modeless dialog box and the window that created it as well as to other programs.

While dialog boxes simplified the presentation of information to a user, often times it was necessary for the user to navigate down a series of cascading dialog boxes to set a value or input information. If the user improperly set a previous value or forgot a key piece of information, it would be necessary to close the series of dialog boxes and begin again. An improvement upon the dialog boxes occurred with the introduction of property sheets. A property sheet (or tabbed dialog box) simplified the display of dialog boxes and typically comprises a frame, title bar and push buttons (e.g., OK, Cancel, Apply, Help). Conventional pages of a property sheet each manages its own control windows (e.g, push buttons, checkboxes and the like) and has a single tab displayed therewith. Thus, each tab is displayed in conjunction with only a single property page such that user selection of the tab can move and display only a single associated page (or dialog box).

While property sheets and their associated property pages have simplified the display of dialog boxes, there continues to be a need in the art for more efficient and flexible processes and apparatuses for displaying dialog boxes. Particularly, there continues to be a need to provide processes and apparatuses accommodating increased flexibility for the display of property pages. Still further, there continues to be a need to provide improved processes and apparatuses for associating a plurality of property pages with a tabbed window, thereby providing simplified user interfaces which are easier to navigate. The present invention incorporates processes and structures which can accommodate the above described benefits.

SUMMARY OF THE INVENTION

Accordingly, it is an object of the present invention to obviate the above-described shortcomings of property sheets and property pages.

It is another object of the present invention to provide graphical user interfaces having improved tabbed windows for flexibly displaying information.

It is still another object of the present invention to provide graphical user interfaces having a plurality of tabbed windows, each tabbed window being capable of displaying one of a plurality of property pages.

It is a further object of the present invention to provide graphical user interfaces having at least one menu window associated with a tab field of a tabbed window.

It is yet another object of the present invention to provide processes for associating a plurality of property pages with a tab field of a tabbed window.

In accordance with one aspect of the present invention, a method for displaying information on a display device of a computer systems is provided which comprises the steps of displaying a parent window and at least one child window of the parent window, wherein the child window has a tab field identifying a category of information. The parent window has a plurality of other displayable child windows associated therewith. A first one of the other child windows is displayed upon user selection of said tab field which has at least one field displayed therein which is selectable by a user of the computer system to initiate the display of a second one of the other child windows. The user can select the field to display a third one of the other child windows.

The third one of the other child windows can be provided in the form of a property page for displaying the properties of an object or the third one of the other child windows can be another selectable field to initiate the display of a fourth one of the other child windows. Preferably, the parent window is provided in the form of a property sheet, and the first one of the other child windows comprises a menu window and the field comprises a menu item.

A user interface for displaying information on a display device of a computer system is also provided. The user interface comprises a parent window, a first child window of the parent window having a tab field identifying a category of information which is selectable by a user to initiate display of a second child window of the parent window. The second child window has at least one field displayed therein which is also user selectable to initiate display of a third child window of the parent window. Preferably, the second child window is provided in the form of a menu window and the field comprises a menu item. The third child window can be provided in the form of a property page.

An object oriented class structure is further provided for use in a computer system. The object oriented class structure represents a parent window and a first child window of the parent window, wherein the child window has a tab field for identifying a category of information which is selectable by a user to initiate display of a second child window and the second child window has at least one field which is selectable by a user to initiate the display of a third child window. The object oriented class structure comprises a first class which is capable of being instantiated into instances of that class having values associated with the parent window. Second and third classes are also provided, the second class comprising at least one method member and being capable of being instantiated into instances having values associated with said first child window and the third class comprising at least one method member and being capable of being instantiated into instances for storing the instances of the second class.

BRIEF DESCRIPTION OF THE DRAWINGS

While the specification concludes with claims particularly pointing out and distinctly claiming the invention, it is believed the same will be better understood from the following description taken in conjunction with the accompanying drawings in which:

DETAILED DESCRIPTION OF THE PREFERRED EMBODIMENTS

Reference will now be made in detail to the preferred embodiments of the present invention, examples of which are illustrated in the accompanying drawings wherein like numerals indicate the same elements throughout the views, and wherein numerals having the same last two digits (e.g., 20, 120) connote corresponding structures between the embodiments. As will be understood hereafter, the preferred embodiments of the present invention relate to processes and apparatuses for displaying a graphical user interface comprising an improved property sheet. More particularly, the preferred property sheets of the present invention comprise a plurality of tabbed windows, each tabbed window being capable of displaying one or more property pages therein. The property pages which are displayed within the tabbed window differ from conventional property pages in that these property pages preferably do not have a tab displayed therewith (the tab rather being displayed with the tabbed window) yet still provide control windows for a setting a group of related properties of an object. For instance, a property page displayed within a tabbed window of the present invention could contain control windows for setting the font properties of an object, including the type style, point size, color and the like. More preferably, property sheets of the present invention comprise a menu window associated with a tab field of each tabbed window for selecting one of the plurality of property pages to be displayed within the tabbed window.

Whereas only one property page could be previously associated with a tab field, preferred embodiments of the present invention can provide the capability of logically grouping or associating one or more property pages with a single tab field. In other words, a logically related group of property pages can be associated with a single tab rather than each property page having its own separate tab. This can provide for more flexible grouping of property pages, thereby permitting a user to more quickly locate and display a particular property page without undesirably cascading through unrelated property pages to locate and display the desired information. Thus, property sheets made in accordance with the present invention are especially useful for managing properties or information which are subject to multiple or tiered groupings, thereby simplifying user interfaces by associating these groupings with a single tabbed window rather than multiple tabbed windows.

The property sheets of the present invention and their associated property pages are typically used to display the properties or attributes of an external object so that these properties can be easily modified as desired. The objects can be related to a computer system or represent an object which is external to a computer system. Examples of these objects might include a user of the computer system, a group of users, a computer system display device, a particular computer, a hard drive or the like. Each object can have one or more properties associated therewith which define the object or its operation. For example, the properties of a user of the computer system might include the user's restrictions, such as the user's login identification, password and network address or the user's postal address. In addition, it is contemplated that the present invention would be useful for displaying other types of information in addition to the properties associated with an external object. For instance, a graphical user interface made in accordance with the present invention comprising a property sheet and tabbed windows could be adapted to accommodate the display of other information such as text, graphics, videos, audio, and the like.

For convenience and ease of discussion, the present invention will be described herein with respect to its implementation by an object oriented developmental language (e.g., JAVA, C++ or the like). As is known in the art, an object oriented developmental language comprises classes having class method members and class data members. A class is a template for an instance of that class, wherein each instance of the class has similar features or attributes which are defined by the class method members and class data members. Class data members define the attributes of instances of a class while the class method members are functions that operate on instances of those classes. While the present invention is preferably implemented by an object oriented developmental language, it is contemplated that it can also be adapted for implementation by other developmental languages (e.g., C, Fortran, Pascal, etc.).

Figure 1:
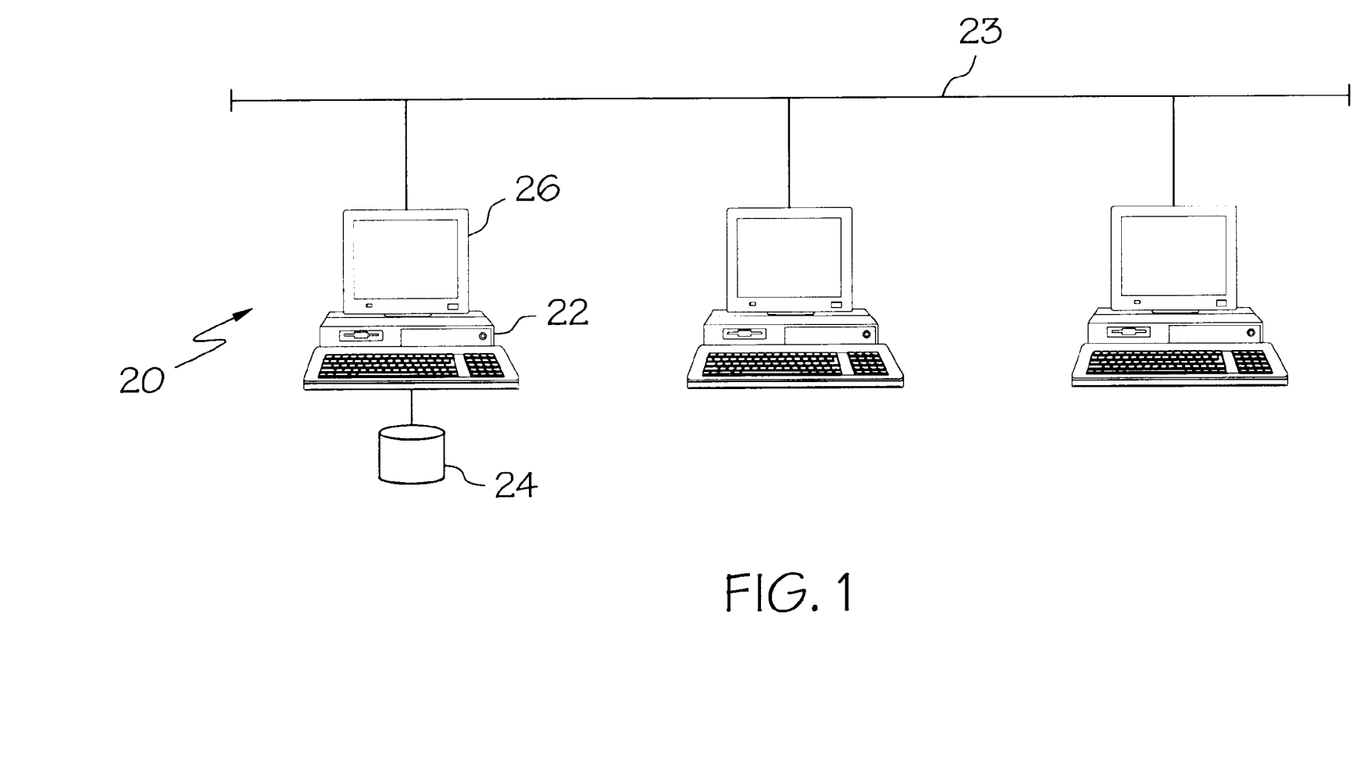
FIG. 1 is a schematic illustration of a computer system suitable for use with the present invention.

Referring to FIG. 1, a computer system 20 suitable for use with the present invention will now be described. The computer system 20 comprises a computer 22 in data communication with a computer readable medium 24 and a display device 26. The computer 22 can be provided in the form of any conventional or special-purpose computer, such as a desktop computer, a tower computer, a micro-computer, a mini-computer, or mainframe computer as well as a palmtop computer, a notebook computer, or a personal digital assistant. The computer 22 can be interconnected with a computer network 23 (e.g, a Local Area Network or Wide Area Network) or can operate independently of other computer systems. The computer readable medium 24 can be provided in the form of a floppy drive, a tape drive, an optical drive, or any other magnetic, optical, or computer-readable storage device having a specific physical substrate configuration. The substrate configuration represents data and instructions which cause the computer 22 to which it is connected to operate in a specific and predefined manner as described herein. Thus, the computer readable medium 24 tangibly embodies a program, functions, and/or instructions that are executable by at least the computer 22 to perform the steps for displaying a graphical user interface made in accordance with the present invention and as discussed more fully hereafter. Other examples of an appropriate computer readable medium 24 can include a hard disk, a CD-ROM, PROM, RAM and the like. Consequently, those of skill in the art will appreciate that the present invention will work with a variety of other computer systems, networks and hardware configurations, although particular individual devices and computer systems are described herein for ease of discussion.

Figure 2:
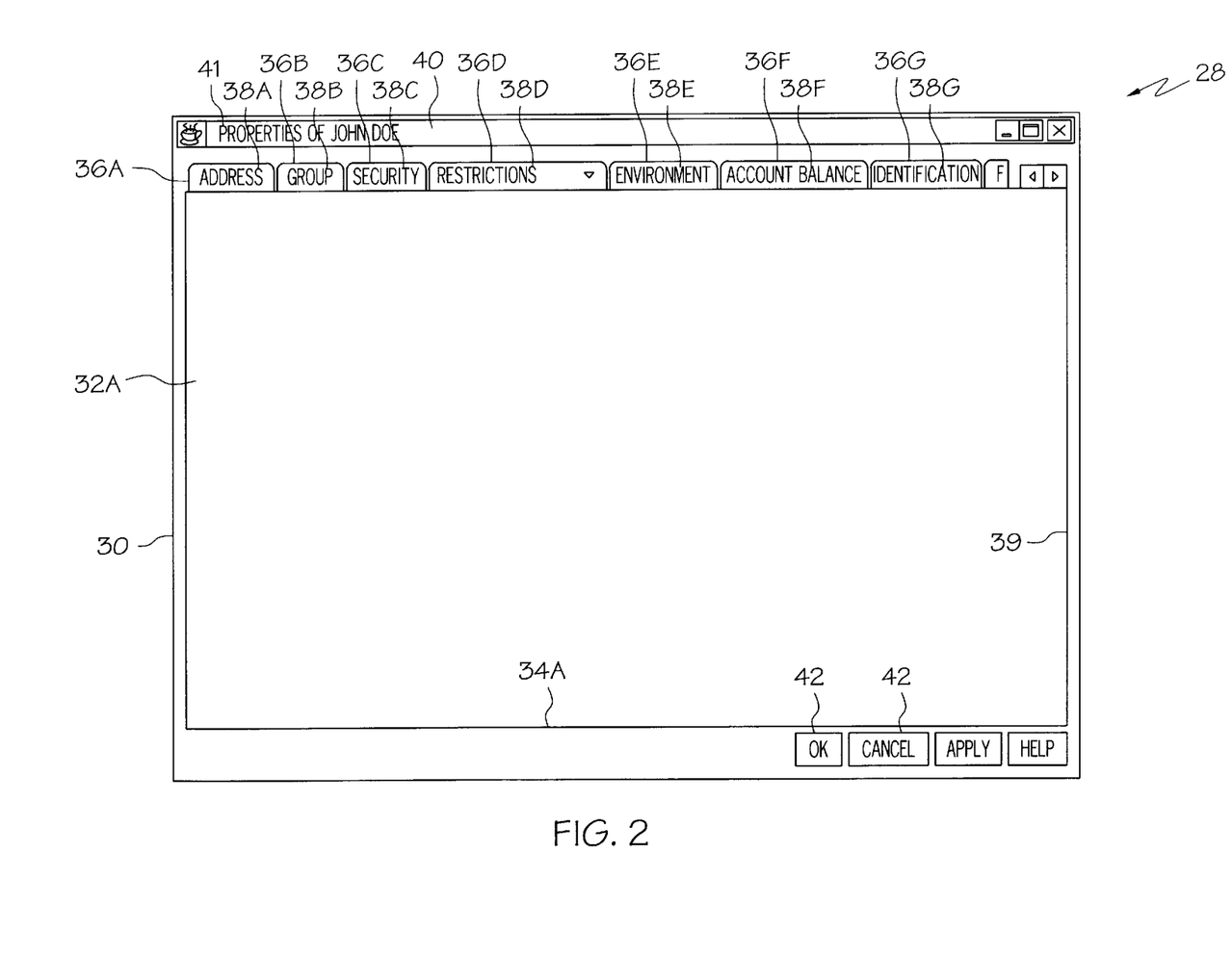
FIG. 2 is a graphical illustration of an exemplary user interface made in accordance with the present invention and provided in the form of a property sheet.

In accordance with one aspect of the present invention, FIG. 2 illustrates an exemplary graphical user interface 28 made in accordance with the present invention which can be displayed on the display device 26 by the computer 22. The graphical user interface 28 comprises a property sheet 30 having a plurality of tabbed windows 32 (tabbed window 32A being displayed in the foreground of the property sheet 30), each tabbed window 32 being capable of displaying one or more property pages either, singularly or simultaneously, within a page content area 34 (e.g., 34A) of the tabbed window 32. Thus, the page content area 34 is a bounded location within the tabbed window 32 within which property pages can be displayed, and it should be apparent that each tabbed window 32 organizes and is capable of displaying one of a plurality of related property pages associated with an external object. In other words, each tabbed window 32 can be generically thought of as a folder from which one or more property pages can be selected for display. Each tabbed window 32 and property page is preferably a child window of the property sheet 30. As used herein, the phrase "child window" refers to a window which exists so long as its parent window exists. More preferably, a child window is also displayed within the bounds of its parent window. Each tabbed window 32 of the property sheet 30 is preferably displayed in an overlapping fashion, similar to a group of cascading windows, if more than one tabbed window 32 is provided. In this overlapping configuration, only a tab field 36 is visible for the tabbed windows which are in the background while a single tabbed window (e.g. 32A) is fully displayed in the foreground. A user can bring a predetermined tabbed window 32 to the foreground by selecting its associated tab field 36 with a selection device, such as a mouse, keyboard input or the like. For example, the process of selection can include moving a cursor adjacent to a predetermined portion of the property sheet 30 (e.g., such as the tab field 36). Alternatively, the process of selection can include activating a portion of the property sheet 30 such as by single or double clicking on the tab field 36 with a mouse or other selection device. Other processes of selection can include use of a shortcut key, highlighting text, or the like.

Each property page is preferably adapted to display property information associated with an external object. The property pages associated with each tabbed window 32 are preferably logically related so that the tab field 36 of each tabbed window 32 generically describes the property pages which can be displayed therein. For example, the exemplary graphical user interface of FIG. 2 comprises a property sheet 30 for displaying the properties associated with a user, John Doe, of the computer 22. Tabbed window 32A is illustrated in the foreground of the property sheet 30 and the remaining tabbed windows 32, with the exception of their tab fields 36 (e.g., 36B, 36C, 36D, etc.), being hidden from view. The exemplary tabbed windows 32 of the property sheet 30 group or organize the property information associated with the user John Doe into seven general categories (e.g., "Identification", "Group", "Security", "Restrictions", etc), each of these categories being described by a text 38 (e.g., 38A, 38B, 38C, etc.) within the tab field 36 of a tabbed window 32.

The property sheet 30 also comprises a sheet frame 39 which defines the bounds of the property sheet 30 and an object text field 40 for displaying a text 41 describing the external object (e.g., the user John Doe). The property sheet 30 can be either modal or modeless. With a modal property sheet, the user must close the property sheet 30 before interfacing with another application in contrast to a modeless property sheet which permits a user to interact with another application while the property sheet is open. One or more controls 42 can also be provided for controlling operation of the property sheet 30. For example, a push button (e.g., OK, Cancel, Apply Now, Help) can be displayed within the frame of the property sheet 30 for implementing changes to the properties of the external object which are displayed by a property page in the page content area 34 of a tabbed window 32. Other controls which can be implemented include a print button, a reset button, and the like.

Figure 3:
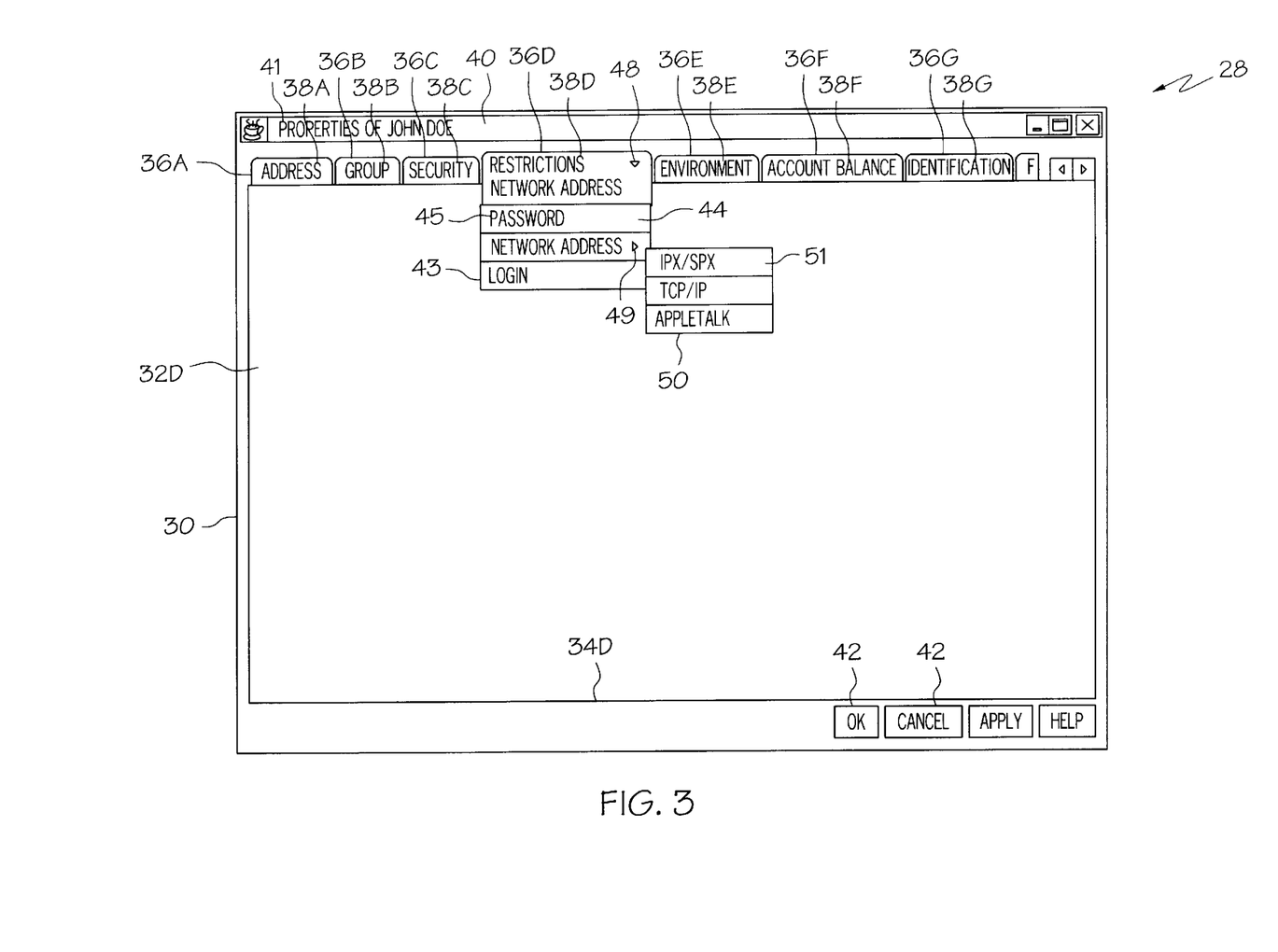
FIG. 3 is a graphical illustration of the property sheet of FIG. 2, wherein the tab field "Restrictions" has been selected by an user.

As discussed more fully hereafter and as shown in FIG. 3, each category of property information (e.g., "Address", "Group", etc.) described by the text 38 of the tab field 36 of a tabbed window 32 can have one or more groups (e.g., first group 43 of FIG. 3) of sub-category fields associated therewith, user selection of each sub-category field either initiating the display of a property page within the page content area of its tabbed window or the display of another group (e.g., second group 50) of second sub-category fields. In either case, the subsequent information which is displayed (i.e., the property page or second group of sub-category fields) is generically described by the text of the sub-category field which was selected. For instance, a text 45 of the sub-category field 44 of the first group 43 would generically describe the sub-category fields of its associated second group 50 much the same as the text 38 of the tab field 36 generically describes the sub-category fields 44 of its associated first group 43. Each group of sub-category fields as well as the sub-category fields displayed therein are preferably displayed as a window and are more preferably child windows of the property sheet 30. Most preferably, the groups of sub-category fields are each displayed in the form of a menu window, such as a pop-up menu as shown in FIG. 3, and the sub-category fields are provided in the form of menu items.

For example, FIG. 3 illustrates the tabbed window 32D in the foreground, wherein the tab text 38D of the tab field 36D describes the category of "Restrictions". Associated with the tab field 36D is a first group 43 of sub-categories fields 44, each sub-category field 44 being logically related to and described by the tab text 38D of its associated tab field 36D. An indicator 48 in the form of an upside down triangle, or similar graphic, can be displayed in the tab field 36D to indicate whether a tabbed window has a first group 43 of sub-category fields 44, as, for instance, does the tabbed window 32D of FIG. 3. User selection of one of the other tab fields (e.g. 36A) which do not have an indicator 48 displayed in a tab field 36 results in a property page being displayed in the page content area 34 of this tabbed window. In contrast selection of the tab field 36D preferably displays a first group 43 of sub-category fields 44 in the form of a pop up menu, wherein the sub-category fields 44 are provided in the form of menu items each having a sub-category text 45 associated therewith. While the first group 43 of sub-category fields 44 is preferably provided in the form of a pop up menu, the first group 43 can be provided in other window forms. For example, the first group 43 can be provided in the form of a floating pop-up menu while the sub-category fields 44 can comprise graphics (e.g., icons or the like) in place of or in addition to the sub-category text 45.

In FIG. 3, the exemplary first group 43 of sub-category fields 44 is illustrated as comprising three sub-categories fields 44 having sub-category texts 46 of "Login", "Network Address", and "Password". Selection of the Login and Password sub-category fields, such as by double clicking on the sub-category field 44 with a mouse, will each initiate the display of a separate property page within the page content area 34D of the tabbed window 32D when selected by the user. An indicator 49 in the form of a sideways triangle is displayed within the sub-category field 44 having the sub-category text "Network Address" to indicate that a second group 50 of sub-category fields 51 are available for display upon selection of this sub-category field 44. For instance, the sub-category fields "IPX/SPX", "TCP/IP" and "Apple Talk" are displayed when the sub-category field "Network Address" of the first group 43 of sub-category fields is selected, as shown in FIG. 3. A property page will be displayed within the page content area 34D of the tabbed window 32D when a sub-category field 51 of the second group 50 is selected because no indicator is displayed within the sub-category fields 51 of the second group 50 indicating that another group of sub-category fields is provided when one of the sub-category fields 51 of the second group 50 is selected. For example, FIG. 4 illustrates an exemplary property page 52 having a "Network Address" field and which is displayed in the page content area 34D of the tabbed window 32D as a result of the selection of the sub-category field "IPX/SPX" of the second group 50.

Thus, it should be readily apparent that the groups of sub-category fields associated with a tab field of a tabbed window can provide improved flexibility for the efficient selection and display of property pages because it provides the capability for grouping related property pages together without having to display a separate tab field for each. In this manner multiple property pages can be associated with a single tab field if desired, thereby providing greater flexibility and ease of navigation within the property pages of a property sheet. Prior to user selection of the tab field 36 and/or a sub-category field, the page content area of the tabbed window 32 which is displayed in the foreground of the property sheet 30 can either display nothing, as shown in FIG. 2, or it can display a default property page within its page content area.

Figure 4:
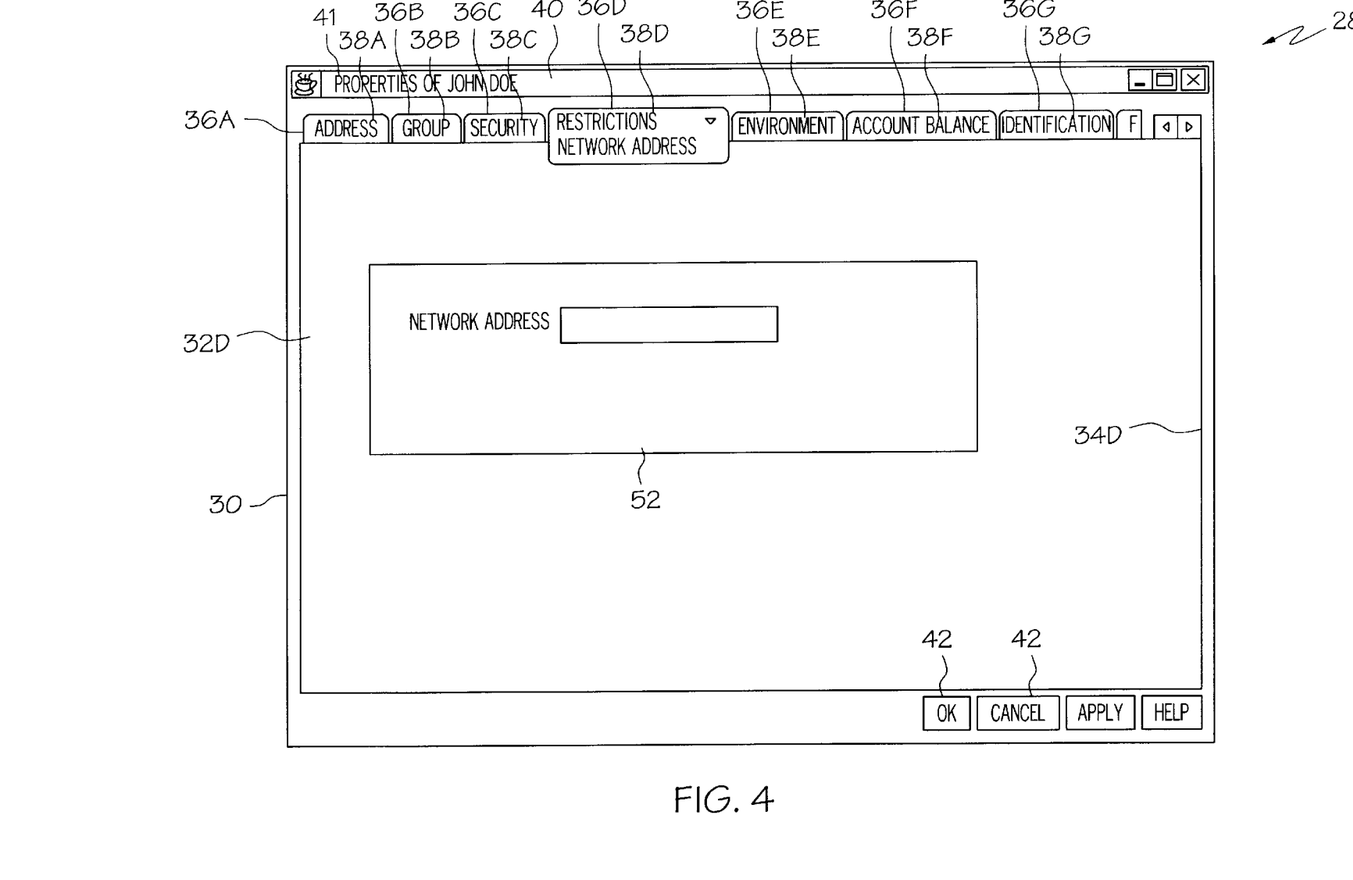
FIG. 4 is a graphical illustration of the user interface of FIG. 3, wherein the user has selected the sub-category field "IPX/SPX" and the property page associated with this field is displayed.

Following the user selection of a sub-category field, the text 38D of the tab field 36D can be modified to display a textual description of the property page displayed within the page content area of the tabbed window, as shown in FIG. 4. Alternatively, it is contemplated that a separate window can be provided adjacent the tab field 36D for providing a textual description of the displayed property page.

Figure 5:
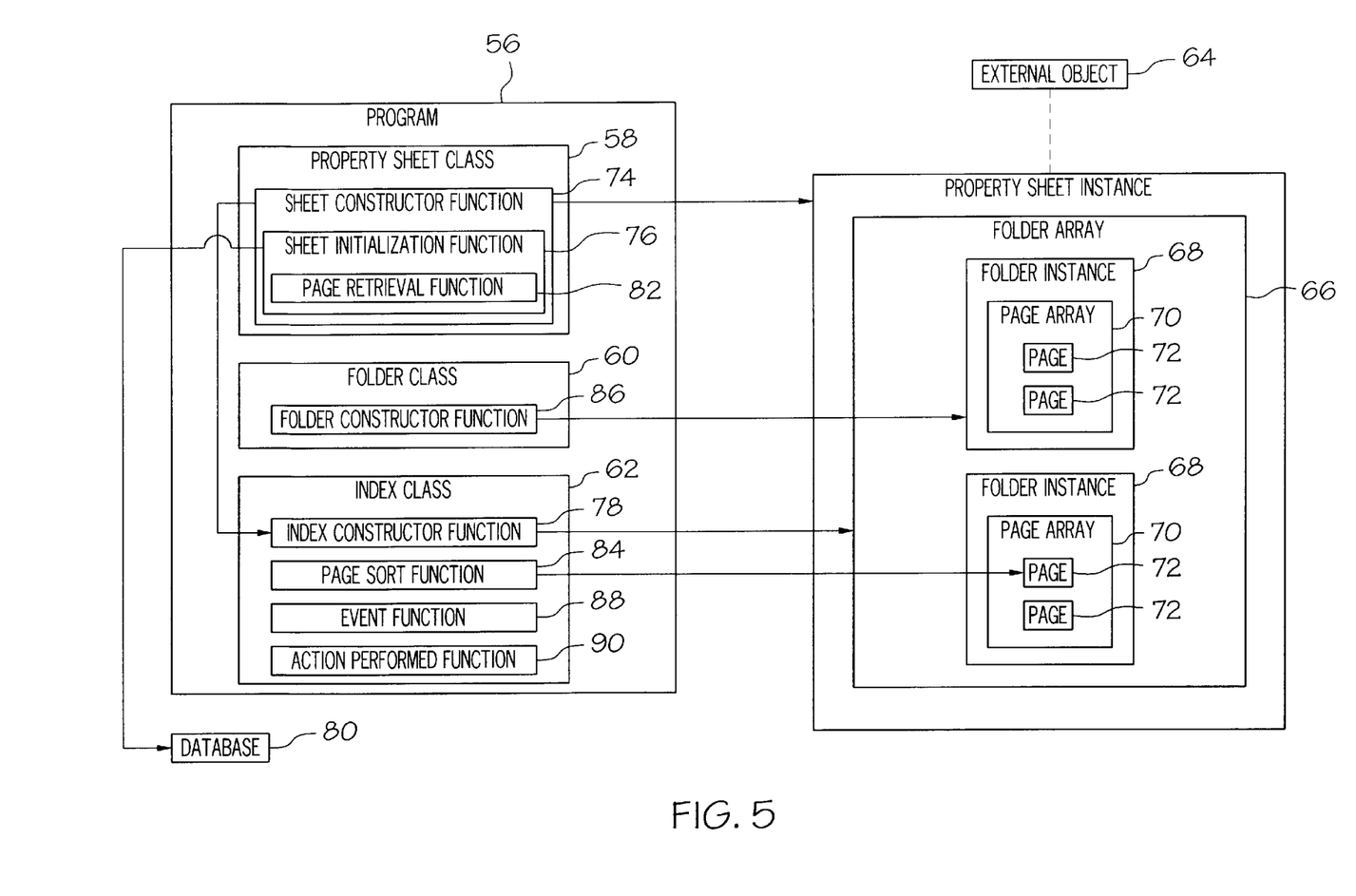
FIG. 5 is a schematic illustration of a computer application for displaying user interfaces made in accordance with the present invention.

In accordance with another aspect of the present invention, apparatuses and processes for displaying graphical user interfaces in accordance with the present invention will now be described. Referring to FIG. 5, a preferred computer program 56 is illustrated which comprises a property sheet class 58, a folder class 60, and an index class 62. These classes can be provided in the object oriented forms known in the art, wherein each class is a template for creating instances of that class. For example, each of these classes can contain data members and method members which are used to define and manipulate the instances of these classes. In a particularly preferred embodiment of the present invention, each instance of the property sheet class 58 is associated with a property sheet 30, as previously described, and an external object 64, such as the user John Doe. Instances of the index class 62 comprise an array 66 of folders 68, the folders 68 being instances of the folder class 60. Each folder 68 is associated with a tabbed window 32 and comprises an array 70 of pages 72, each page 72 being a structure for storing a set of information associated with a property page which can be displayed in the page content area of its associated tabbed window 32.

The preferred structure of each of the above-described classes of the present invention will now be described in greater detail in combination with FIG. 5 as well as Tables 1, 2 and 3. Table 1 lists the pseudo code of a preferred embodiment of the property sheet class 58. The property sheet class 58 comprises a sheet constructor function 74 for instances of this class and a sheet initialization function 76. The sheet constructor function 74 preferably creates an instance of the property sheet class 58 and calls the index constructor function 78 of the index class 62 for creating an instance of the index class which comprises the folder array 66. The sheet constructor function 64 preferably has an argument which defines the external object which is associated with the property sheet and calls the sheet initialization function 76 passing this argument. The sheet initialization function 76 in turn calls a page retrieval function 82 for retrieving from a database 80 a set of information about each of the property pages associated with the external object 64. In other words, each property page associated with the external object will have a set of information associated therewith which defines the property page and which can be later used to display the property page in the page display area 34 of a tabbed window 32. The sets of information retrieved from the database 80 can be stored in an array (e.g., propertyPages in Table 1) which is used by the sheet initialization function 76, as described more fully hereafter.

For example, the argument "the Object" of Table 1 can be used to define the user John Doe so that information about all the property pages associated with this object can be retrieved from the database 80 using the page retrieval function 82. In addition, the sheet constructor function 74 (or the sheet initialization function 76) can define the layout (e.g., color, size, location, etc.) and other visual characteristics of the property sheet 30. For instance, the sheet constructor function 74 could define the controls 42 associated with the property sheet 30, such as a help button, a cancel button, or an apply button. The sheet initialization function 76 also preferably calls a page sort function 84 for filling the page array 70 associated with each instance of the folder class 68 with the appropriate sets of information using the array (e.g., propertyPages in Table 1) of pages returned by the page retrieval function 82, as shown in Table 1 and as discussed more fully hereafter.

TABLE 1

```
public class property sheet
{
    public propertySheet (the object)
    {
        index = new Index();
        set background( Color.lightGray );
        buttonPanel.add( OKButton );
        sheetInitialize (pageRetrieval(theObject))
    public void sheetInitialize (Vector propertyPages)
    {
        int    howMany = propertyPages.size();
        for( int cntr=0; cntr<howMany; ++cntr)
        {
            apage = (propertyPage)propertyPages.elementAt( cntr);
            index.pageSort( aPage );
        }
    }
    public Vector pageRetrieval( theObject )
    {
        return pages
    }
}
```

Referring to Table 2, a preferred embodiment of the index class 62 will now be described in greater detail. The index class 62 preferably comprises the index constructor function 78 which creates the folder array 66 for storing instances 68 of the folder class 60. The index constructor function 78 also preferably defines the visual aspects for each tabbed window 32, such as the background color, foreground color, fonts, and the like. The index class 62 further comprises the page sort function 84 which is called by the sheet initialization function 76 of the property sheet class 58. The page sort function 84 preferably creates instances of the folder class 60 (i.e., folders 70) by calling a folder constructor function 86 of the folder class 60 and sorts the sets of information retrieved from the database 80 about each of the property pages associated with the external object into the appropriate page array 72 associated with each folder 68. The sets of information about the property pages can be sorted by comparing, for example, the tab name associated with each set of information (i.e., the tab name associated with a particular property page) with the tab caption for each folder 68. Once the appropriate folder 68 is either created (using the tab caption from a set of information) or located because it already exists, this set of information is added to the appropriate page array 70 (e.g., using the f.addpageinfo call in Table 2).

In addition, the index class 62 also comprises an event function 88 for determining which tabbed window 32 a user selects from a property sheet 30 and for displaying the appropriate group of sub-category fields with the tabbed window 32. As will be readily apparent, the page array 70 of each folder 68 is associated with a group of the sub-category fields of a tabbed window 32, with each tabbed window 32 being associated with a separate folder 68. Thus, the folder array 66 contains all the information associated with the structure and function of the plurality of tabbed windows 32 displayed with the property sheet 30. The index class 62 also comprises an action performed function 90 for determining which sub-category field 44 a user has selected and for displaying the appropriate property page in the page content area 34 of the appropriate tabbed window 32. The function displaying the property page (e.g., displayPage in Table 2) can use the set of information for directly displaying the property page or as a registration for retrieving additional information to display the property page. In this manner, developers can later add customized property pages as desired by registration.

TABLE 2

```
public class Index
{
  public Index()
  {
    folders = new Vector();
    this.fgcolor = fgColor;
    this.bgColor = bgColor;
  }
  public void pageSort( page )
  {
    Folder f;
    String tabName = page.getTabName(); // get the tab name for the page
    String       pageName = new String( "Page" + pageID );
    PageInfo     thePageInfo = new PageInfo( page, pageName );
    pageID += 1; // increment page counter
    if( folders.size() = 0 ) // does a folder exist for the page
    {
      folders.addElement( new Folder());
      f = (Folder)folders.lastElement();
    }
    else // there are existing folders
    {
      f = firstFolder();
      while( f! = null && tabName.compareTo( f.getCaption()) != 0)
        f = getNext( f );
      if( f==null) // if tab not there
      {
        folders.addElement( new Folder());
        f = (Folder)folders.lastElement();
      }
    }
    f.addpageInfo(thePageInfo);
  }
  public void actionperformed(ActionEvent e)
  {
  String     pageName = e.getActionCommand();
  Vector    thePages = lastSelected.getPages();
  int              howMany = thePages.size();
  for( int x=0; x<howMany; ++x)    // populate the pop up menu
    {
    if(pageName.compareTo(((PageInfo)thePages.elementAt(x)).
      getPageLayoutName ()) == 0)
      {
      aPage = ((PageInfo)thePages.elementAt(x));
      break;
      }
    }
  if( aPage != null)
    displayPage( pageName, aPage );
  }
  protected void processEvent( MouseEvent event )
  {
    Point    where = new Point( event.getPoint());
    Rectangle tabRect;
    Folder    f;
    switch( event.getID() )
    {
    case MouseEvent.MOUSE_CLICKED:
    {
      for( f=firstFolder(); f!=null; f=getNext(f))
      {
        tabRect = f.getTabBounds();
        if( tabRect.contains( where.x, where.y ))
        break;
      }
      if( f !=null)    // got the selected folder
      {
      lastSelected = f;
      Vector thePages = f.getPages();
      if( thePages.size() > 1 )
        {
        PopupMenu   aMenu = new PopupMenu();
        int   howMany = thePages.size();
```

TABLE 2-continued

```
    for( int x=0; x<howMany; ++x)
    {
    display thePages PropertyPage(x));
    }                    }
    break;
}
```

Referring to Table 3 below, a preferred embodiment of the folder class 60 will now be described. The folder class 60 comprises the folder constructor function 86 which is called by the page sort function 84 of the index class 82 and which creates the page array 70 (e.g., thePages in Table 3). In addition, the folder constructor function 86 defines the visual characteristics the tab field 36 of the tabbed window 32 associated with a folder 68 of a folder class 60.

TABLE 3

```
public class Folder
{
    public Folder()
    {
    thePages = new Vector();
    tab = new Tab( caption, normalFont, selectFont, captionColor,
    pageColor); page = new Page( pageColor );
    }
}
```

Figure 6:
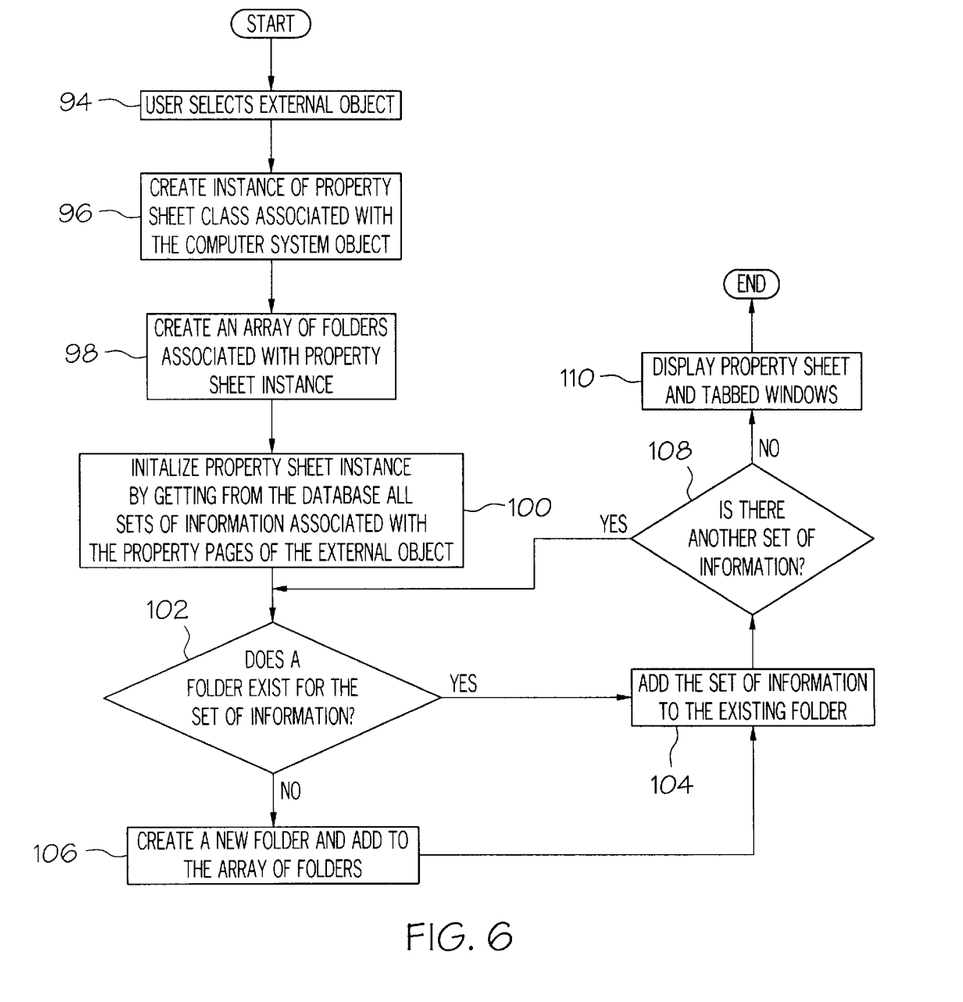
FIG. 6 is a schematic illustration of a preferred process made in accordance with the present invention which can be implemented by the computer system of FIG. 1.

In accordance with another aspect of the present invention, a preferred process 92 for implementing the present invention with the property sheet class 58, folder class 60 and index class 62 of FIG. 5 will now be described. As shown in FIG. 6, a user first selects an external object in block 94, the properties of which it is desired to display and/or modify with the computer 20. For example, the user might be a network administrator who is administering a computer network and the external object whose properties are to be modified might be a computer user who has access to the computer network. The external object can be selected by clicking on an icon, text, or the like representing the external object and which is displayed on the display device 26 of the computer 20. Upon selection of the external object, the sheet constructor function 74 of the property sheet class 58 is called to create an instance of this class which is associated with the selected external object, as shown in block 96. The sheet constructor function 74 in turn calls the index constructor function 74 to create the folder array 66 in block 98 which is associated with the instance of the property sheet class 58 created in block 96. Next, the sets of information for the property pages which are associated with the external object selected in block 94 are retrieved from the database 80 in block 100 by the page retrieval function 82. The page sort function 84 of the index class 62 is then called to sort the sets of information property retrieved in block 100. The sets of information can be sorted by, for example, comparing the tab name of a set of information received from the database 80 with the tab text field (e.g., also represented by the variable "caption" of a folder as shown in Table 2) associated with a tabbed window 32, as further illustrated in Table 2.

More particularly, the sort page function 84 is called for each set of information retrieved in block 100. For each set of information, block 102 determines if a folder 68 exists in the folder array 66 for this set of information. If a folder 68 exists for this set of information, it is added to the page array 70 of this folder 68, as shown in block 104 (e.g., addpage-info in Table 2 is executed). If a folder 68 does not exist for this set of information, a new folder 68 is created and added to the folder array 66 in block 106, after which set of information is added to the page array 70 of this newly created folder 68. The folder 68 is created by calling the folder class constructor function 86 of the folder class 60. Each set of information associated with a property page retrieved in block 100 is assigned to a folder until all the sets have been sorted, as dictated by block 108. Once all the sets of information have been assigned to their respective folders, a tabbed window 32 is displayed within the property sheet 30 for each instance of the folder class 60 (i.e., folder 68) which was created in block 106, as shown in block 110.

Figure 7:
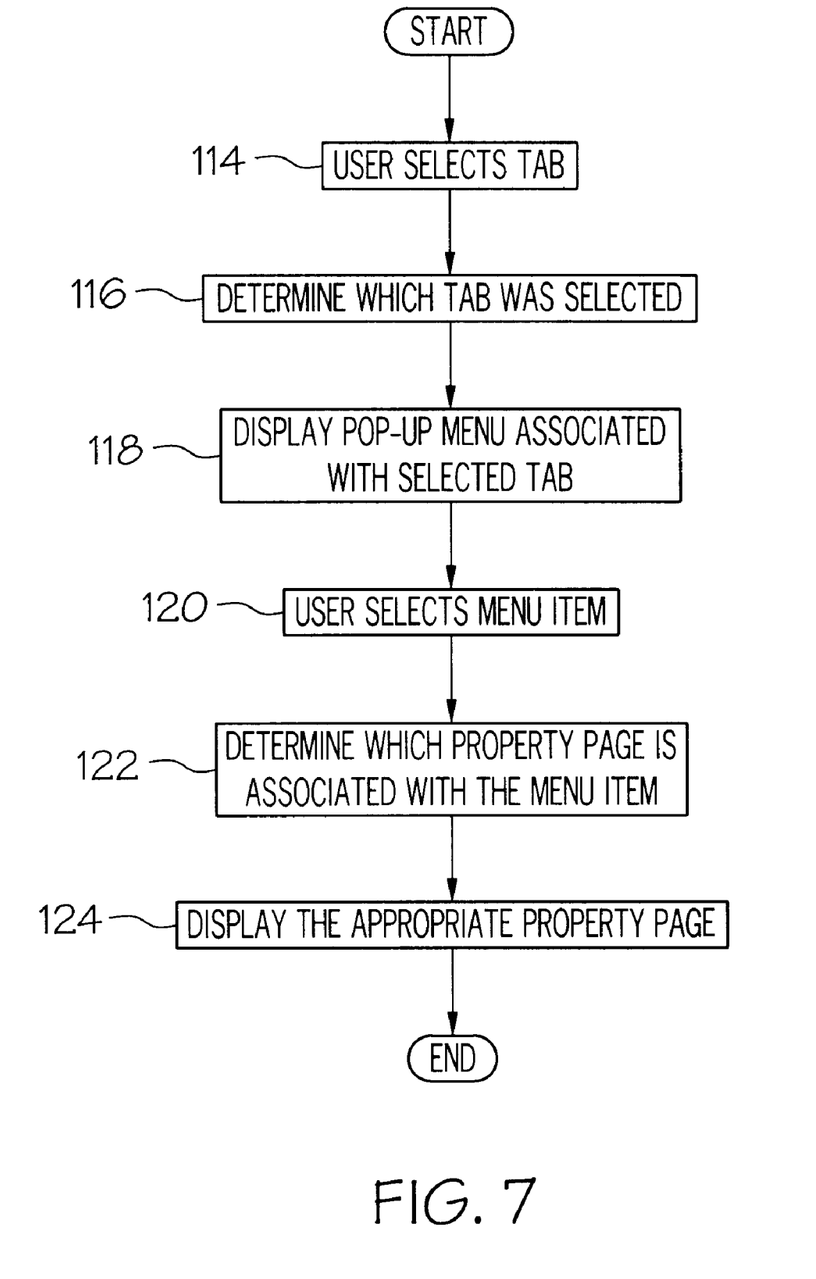
FIG. 7 is a schematic illustration of another preferred process made in accordance with the present invention which can be implemented by the computer system of FIG. 1.

Referring now to FIG. 7, a preferred process 112 for displaying a predetermined property page on the display device 26 in accordance with another aspect of the present invention will now be described. After displaying the property sheet 30 and tabbed windows 32 on the display device according to the preferred process 92 previously described, a user of the computer 22 can select a tab field 36 of a tabbed window 32 displayed within the frame 39 of the property sheet 30. Upon selection of a tab field 36 by the user in block 114, the event function 88 of the index class 62 is called to determine which tab field 36 the user selected, as indicated in block 116. This can be accomplished, for example, by comparing a cursor location to the location of each tab field for each of the tabbed windows 32 as defined in the appropriate folder 68. Once the appropriate folder 68 is located, a group of sub-category fields in the form of a pop-up menu is displayed, as shown in block 118. The pop-up menu has a plurality of menu items, each menu item preferably associated with a property page or another group of sub-category fields. A user then selects the appropriate menu item in block 120 and the action performed function 90 of the index class 62 is called in block 122 to determine which menu item was selected and display the appropriate property page within the page content area 34 of the associated tabbed window 32 in block 124 using the appropriate set of information stored in the page array 70.

Having shown and described the preferred embodiments of the present invention, further adaptation of the apparatuses and processes for displaying information in accordance with the present invention can be accomplished by appropriate modifications by one of ordinary skill in the art without departing from the scope of the present invention. A number of alternatives and modifications have been described herein and others will be apparent to those skilled in the art. For example, it is contemplated that multiple property pages can be simultaneously displayed in a page content area of a tabbed window or that certain classes, method members and data members described herein can be combined, modified, or altered without departing from the scope of the present invention. Accordingly, the scope of the present invention should be considered in terms of the following claims and is understood not to be limited to the details of the structures and methods shown and described in the specification and drawings.

What is claimed is:

1. A method for displaying information on a display device of a computer system, comprising the steps of:
   displaying a parent window and at least one child window of said parent window having a tab field identifying a category of information, said parent window is provided in the form of a property sheet and has a plurality of other displayable child windows associated therewith; and
   displaying a first one of said other child windows upon user selection of said tab field, said first one of said other child windows having at least one field displayed therein which is selectable by a user of the computer system to initiate the display of a second one of said other child windows.

2. The method of claim 1, further comprising the step of a user selecting said field and displaying a third one of said other child windows.

3. The method of claim 2, wherein said third one of said other child windows is provided in the form of a property page for displaying the properties of an object.

4. The method of claim 2, wherein said third one of said other child windows comprises another selectable field to initiate the display of a fourth one of said other child windows.

5. The method of claim 1, wherein said field is selected by moving a selection device within about said field.

6. The method of claim 1, further comprising the step of displaying a plurality of said child windows having a tab field.

7. The method of claim 1, wherein said first one of said other child windows comprises a menu window and said field comprises a menu item.

8. The method of claim 1, wherein said first one of said other child windows comprises a plurality of said fields.

9. A computer readable medium, comprising software capable of performing the method of claim 1.

10. A user interface for displaying information on a display device of a computer system, comprising:
  a parent window, wherein the parent window comprises a property sheet;
  a first child window of said parent window having a tab field identifying a category of information which is selectable by a user to initiate display of a second child window of said parent window; and
  said second child window having at least one field displayed therein which is selectable to initiate display of a third child window of said parent window.

11. The user interface of claim 10, wherein said second child window is provided in the form of a menu window and said field comprises a menu item.

12. The user interface of claim 10, wherein said third child window is a property page.

13. The user interface of claim 10, wherein said third child window comprises another field which is selectable to initiate the display of a fourth child window.

14. The user interface of claim 13, wherein said fourth child window comprises a property page.

15. In a computer system, an object oriented class structure for representing a parent window, a first child window of the parent window with a tab field for identifying a category of information, the tab field being selectable to initiate display of a second child window, which has at least one field which is selectable by a user to initiate the display of a third child window, said object oriented class structure comprising:
  a first class comprising at least one method member and being capable of being instantiated into instances having values associated with said parent window;
  a second class comprising at least one method member and being capable of being instantiated into instances having values associated with said first child window; and
  a third class comprising at least one method member and being capable of being instantiated into instances storing said instances of said second class.

16. The object oriented class structure of claim 15, wherein said instances of said second class comprise an array for storing information related to said third child a window.

17. The object oriented class structure of claim 16, wherein said first class further comprises a method member for retrieving from a database said information related to said third child a window.

18. The object oriented class structure of claim 15, wherein each of said instances of said third class comprise an array for storing said instances of said second class.

19. The object oriented class structure of claim 16, wherein said third class further comprises a method member for sorting said information relating to said third child window.

20. A method for displaying information on a display device of a computer system, comprising the steps of:
  displaying a parent window and at least one child window of the parent window having a tab field identifying a category of information, the parent window having a plurality of other displayable child windows associated therewith;
  displaying a first one of the other child windows upon user selection of the tab field, the first one of the other child windows having at least one field displayed therein which is selectable by a user of the computer system to initiate the display of a second one of the other child windows; and
  displaying a third one of the other child windows upon user selection of the tab field, wherein the third one of the other child windows is provided in the form of a property page for displaying the properties of an object.

21. A user interface for displaying information on a display device of a computer system, comprising:
  a parent window;
  a first child window of the parent window having a tab field identifying a category of information which is selectable by a user to initiate display of a second child window of the parent window; and
  the second child window having at least one field displayed therein which is selectable to initiate display of a third child window of the parent window, wherein the third child window is a property page.

22. A user interface for displaying information on a display device of a computer system, comprising:
  a parent window;
  a first child window of the parent window having a tab field identifying a category of information which is selectable by a user to initiate display of a second child window of the parent window; and
  the second child window having at least one field displayed therein which is selectable to initiate display of a third child window of the parent window, wherein the third child window comprises another field which is selectable to initiate the display of a fourth child window, wherein the fourth child window comprises a property page.

* * * * *